INVENTOR.
JOHN W. BLAIR

Oct. 27, 1959  J. W. BLAIR  2,910,327
AUTOMATIC BRAKING DEVICE
Filed Aug. 8, 1956  2 Sheets-Sheet 2

INVENTOR.
JOHN W. BLAIR
BY
William P. Hickey
ATTORNEY

United States Patent Office 2,910,327
Patented Oct. 27, 1959

2,910,327

AUTOMATIC BRAKING DEVICE

John W. Blair, South Bend, Ind., assignor to Bendix Aviation Corporation, South Bend, Ind., a corporation of Delaware Application August 8, 1956, Serial No. 602,693

2 Claims. (Cl. 303—63)

The present invention relates to automotive braking systems, and to a special kind of control valve therefor.

An object of the present invention is the provision of a new and improved automotive braking system and the like wherein, automatic valve means is positioned between a brake applying fluid pressure motor and its normally used control valve to: automatically isolate the control valve from the motor, communicate atmospheric pressure to one side of the fluid pressure motor, and an auxiliary reservoir of pneumatic pressure to the other side of the fluid pressure motor to provide a full brake application when the pressure differential between atmosphere and the fluid pressure supply normally used to actuate the fluid pressure motor decreases below a predetermined level.

A further object of the invention is the provision of a new and improved braking system of the above described type wherein the auxiliary reservoir is supplied by the normal fluid pressure supply, and is provided with means which isolates the auxiliary reservoir from the normal fluid pressure supply when the differential pressure between the reservoir and the atmosphere is greater than that between the normal pressure supply and the atmosphere.

Another object of the invention is the provision of a new and improved automatic valve means positionable between a control valve and a fluid pressure motor which it controls; said means being adapted to normally communicate a normal supply of vacuum to one side of the fluid pressure motor, and said control valve with the opposed side of the fluid pressure motor; and being adapted upon a decrease in intensity of the normal vacuum supply to automatically isolate the control valve from the fluid pressure motor, to communicate an auxiliary vacuum supply to said one side of the fluid pressure motor, and to automatically communicate full atmospheric pressure to said opposed side of the fluid pressure motor to automatically actuate the fluid pressure motor.

A still further object of the invention is the provision of new and improved valve means of the above described type in which the valve sequentially closes off communication between the normal vacuum source and one side of the fluid pressure motor, admits an auxiliary source of vacuum to said one side of the fluid pressure motor, closes off communication of said control valve with the opposed side of the fluid pressure motor, and thereafter communicates atmospheric pressure to said opposed side of the fluid pressure motor.

Further objects and advantages of the present invention will be apparent to those skilled in the art to which the invention relates from the following description of the preferred embodiment described with reference to the accompanying drawing forming a part of this specification, and in which.

Figure 1:
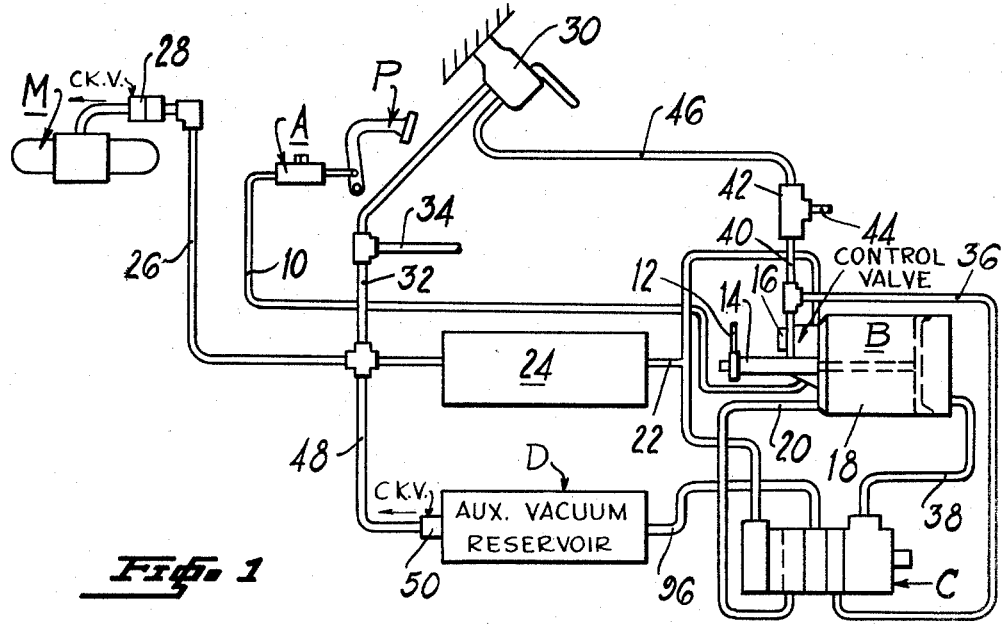
Figure 1 is a schematic drawing of a pneumatic actuated braking system of a tractor trailer combination automotive vehicle embodying the principles of the present invention.
Figure 2:
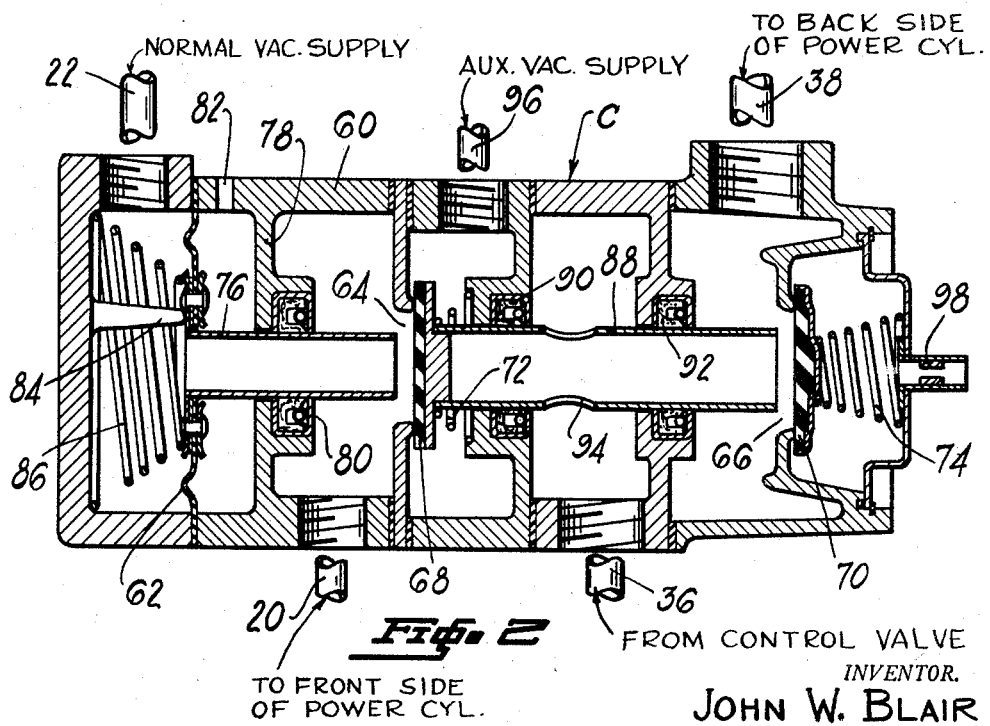
Figure 2 is a cross sectional view of one part of the mechanism shown in Figure 1.
Figure 3:
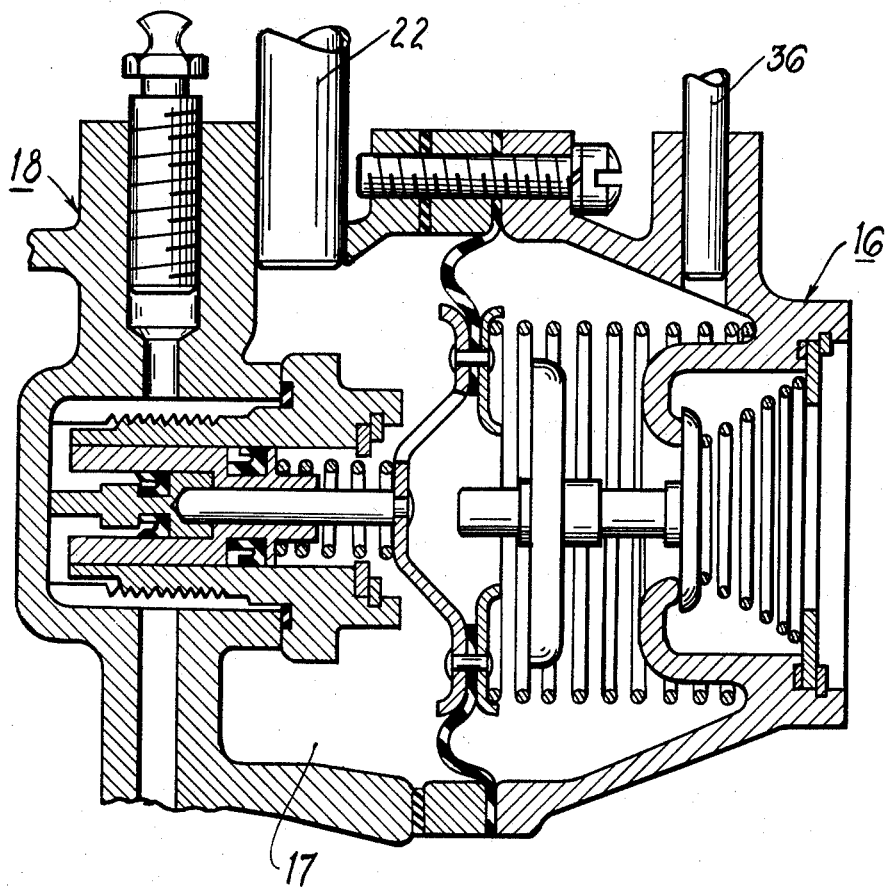
Figure 3 is an enlarged cross-sectional view of the valving of the fluid pressure servo-motor shown in Figure 1.

The braking system shown in Figure 1 generally comprises a foot pedal lever operated master cylinder A, the hydraulic output of which is communicated through line 10 to a pneumatic fluid pressure servo-motor B. The fluid pressure servo-motor B is quite similar in its construction and operation to that shown in Patent 2,719,609—differing only in its control valve structure—and is in turn adapted to supply hydraulic pressure through its output line 12 to the wheel cylinders (not shown) of the tractor portion of a tractor-trailer truck. The hydraulic cylinder portion 14 of the servo-motor B contains a check valved passage in its hydraulic piston which permits pressure from master cylinder A to be communicated directly to the tractor wheel cylinders (not shown) when the servo-motor B is not power actuated. The servo-motor B is also provided with internal passages which communicate the hydraulic input signal from the line 10 to a hydraulically actuated pneumatic control valve 16 integrally mounted on the unit. The control valve 16, shown in Figure 3 differs principally from that shown in Patent 2,719,609 in that there is no opening in the casting wall separating the vacuum chamber 17 of the control valve 16 and the front chamber of the power cylinder 18. Vacuum is normally supplied to the front chamber of the power cylinder 18 through line 20; and to the vacuum chamber of control valve 16 through a branch of line 22. Control valve 16 normally (during the de-energized condition of the servo-motor) communicates vacuum from line 22 to the back side (right hand side) of the power cylinder 18; and upon receiving a hydraulic input signal from the master cylinder A, bleeds air into the back side of the power cylinder 18 in proportion to the intensity of the input signal. The power piston of the servo-motor B thereupon moves to the left to provide a power application of the vehicle brakes, the intensity of which application is generally proportional to the intensity of the input signal supplied by the master cylinder A.

The braking system shown in Figure 1 is adapted to be power actuated by vacuum from the manifold M of the motor of the tractor. Vacuum from the engine manifold is conducted to a service vacuum reservoir 24 (adapted to smooth out pulsations in the system) through line 26 and check valve 28. Check valve 28 is so positioned in the system as to prevent pressure back flow from the manifold M from reaching the service reservoir 24 during times when manifold vacuum is reduced by excessive opening of the butterfly valve in the carburetor in the truck engine. Service vacuum from line 26 is also communicated to the hand control valve 30 of the tractor through line 32; and to the trailer portion of the truck through line 34 only a portion of which is shown. The trailer braking system to which line 34 is attached is of a well known commercial construction—for a complete understanding of its construction and operation reference may be had to the above referred to Patent 2,719,609.

Vacuum from the service vacuum reservoir 24 is normally communicated to the front side of the power piston of the servo-motor; and control pressure from the control valve 16 of the servo-motor is normally communicated to the back side of the power piston, through the valve means C which will later be described. Actuation of the system above described is normally brought about by depressing of the brake pedal P, whereupon hydraulic pressure from the master cylinder A operates the control valve 16 of the servo-motor to admit pressure to the back side of the power cylinder 18 through lines 36 and 38. Control pressure from the control valve 16 is also communicated to the trailer control system through line 40, shuttle valve 42, and the trailer control line 44. The shuttle valve 42 is a two-way check valve of known construction (see Patent 2,719,609 above referred to) adapted to communicate either line 40 or the hand control valve signal in line 46 with the trailer control line 44, depending upon which of the lines 40 or 46 is supplied with the greater pressure. If the operator so desires he may operate the hand control valve 30 to increase the control pressure in line 46 above that being supplied by the control valve 16 to shift the valve mechanism in the shuttle valve 42 and thereby increase the control pressure in the trailer line 44. If one of the control lines in the braking system should become ruptured, atmospheric pressure will rush into the servo-motor B and/or the trailer control line 44 to automatically apply the brakes of the vehicle. It is a drawback of the system so far described that a minor leak in the normal manifold vacuum supply system will be communicated to the control side of the system, or vice versa, through the normally open hand control valve 30 and/or the normally opened servo-motor control valve 16 such that both the service lines and the control lines become balanced at approximately the same pressure. The servo-motor B is therefore not automatically applied by leaks of this nature; and the braking effort of which the system is capable is cut down proportionately to the vacuum loss of the system.

According to the principles of the present invention there is provided an auxiliary vacuum reservoir D and the control valve means C which when the service vacuum bleeds down to a predetermined point automatically isolates the servo-motor control valve 16 from the power cylinder 18, communicates the auxiliary reservoir D with the front side of the power cylinder 18, and automatically dumps atmospheric pressure upon the back side of the power cylinder 18 to provide a complete and full application of the vehicle's brakes. The reservoir D is supplied with vacuum from the vacuum service line 26 through line 48 and check valve 50. Check valve 50 is so constructed and arranged as to prevent pressure back flow from line 48 into the auxiliary reservoir D.

The valve means C shown in the drawing generally comprises a body member 60 having seven aligned valve chambers. A movable wall or a diaphragm 62 separates the first and second chambers; a valve port 64 is provided between the third and fourth chambers; and another valve port 66 is provided between the sixth and seventh chambers. A movable valve closure member 68 is provided in the fourth chamber and is normally biased into position closing valve port 64 by means of a coil spring 72; and a valve closure member 70 is provided in the seventh chamber and is biased into a position closing the valve port 66 by a coil spring 74. A tubular valve member 76 opened at both ends is suitably riveted to the diaphragm 62 and extends through the rigid partition member 78 between the second and third valve chambers into close proximity with the movable valve closure member 68. A suitable seal 80 is provided in the partition member 78 to isolate the second and third valve chambers and still permit axial movement of the tubular valve member 76. Normal service vacuum from the service vacuum reservoir is communicated to the first valve chamber by means of line 22, and atmospheric pressure is communicated to the second valve chamber by means of an opening 82 in the valve body member 60. Normal pressure differential across the diaphragm 62 normally holds the diaphragm into engagement with a stop 84 in the first valve chamber. Service vacuum from the reservoir 24 is therefore normally communicated from the service vacuum reservoir 24 through line 22, tubular member 76 to the third valve chamber; and thence through line 20 to the front side of the power cylinder 18. A coil spring 86 is positioned in the first valve chamber to oppose pressure differential across diaphragm 62. When the differential pressure between the first and second chambers decreases to a predetermined level (say approximately fifteen inches of mercury vacuum), spring 86 forces tubular valve member 76 into end abutment with the movable valve closure member 68 to close off further communication between the normal vacuum service reservoir 24 and the front side of the power cylinder 18.

The valve closure member 68 is provided with a generally tubular valve member 88 which extends rearwardly through the rigid partition members between the fourth and fifth, and fifth and sixth chambers, respectively, into close proximity with the movable valve closure member 70 in the seventh valve chamber. Seals 90 and 92 are provided in the respective partition members which prevent leakage between adjacent chambers and still permit axial movement of the tubular member 88. Coil spring 72 normally holds the tubular valve member 88 in a left hand position wherein the end of the tubular valve member 88 is held out of engagement with the valve closure member 70. In this position opening 94 in the side walls of the tubular valve member 88 permits communication between the fifth and sixth valve chambers. In this normal position of the tubular valve member 88, control pressure from the servo-motor control valve 16 is communicated to the fifth valve chamber through line 36; and thence to the sixth valve chamber and line 38 to the back side of the power cylinder 18.

Auxiliary vacuum from the auxiliary reservoir D is communicated to the fourth valve chamber through line 96. When the differential pressure between normal service vacuum and the atmosphere decreases to the previously referred to level (say approximately fifteen inches of mercury vacuum), the spring 86 forces the tubular valve member 76 rearwardly into engagement with the valve closure member 68 thereby cutting off the vacuum service supply to the front side of the power cylinder 18. Continued rearward movement of the tubular valve member 76 thereafter forces the movable valve closure member 68 rearwardly to open valve port 64 and thereby communicate the auxiliary vacuum reservoir D with the front side of the power cylinder 18. Continued rearward movement of the tubular valve member 76 forces the tubular valve member 88 into end abutment with the movable valve closure member 70, thereby closing off communication between the servo-motor control valve 16 and the back side of its power cylinder 18. Additional rearward movement of the diaphragm 62 thereafter moves the valve closure member 70 rearwardly to open valve port 66 and dump atmospheric pressure upon the rear side of the power cylinder 18. The pressure differential between the auxiliary reservoir D and the atmosphere is therefore applied across the servo-motor's power piston to automatically fully and completely apply the tractor brakes.

It will thus be seen that there has been provided a new and improved automotive braking system which automatically applies the vehicle brakes in stage depending upon the degree of vacuum failure; and which automatic application cannot be interfered with by the operator. The first of these stages of automatic application closes off communication of the normal vacuum supply to the front side of the power piston 18 and thereafter dumps the auxiliary vacuum supply to this chamber. This partially depleted vacuum supply from reservoir 24 is still, however, being supplied to the back side of the power cylinder 18 through line 22, control valve 16 and lines 36 and 38. The pressure differential between the now partially depleted service vacuum reservoir 24 and the auxiliary reservoir D, is thereby supplied across the servo-motor's power piston to provide a partial application of the vehicle's brakes. This application warns the operator of a failure in the normal vacuum supply. If the operator then wants to stop the vehicle more quickly, he depresses the foot pedal lever P, whereupon the hydraulic input signal from the master cylinder A operates the servo-motor control valve 16 to dump air pressure on the back side of the power cylinder 18. Should the operator fail to do anything about the partial application of the vehicle's brakes, further depletion of the normal vacuum supply in reservoir 24 causes the tubular valve member 76 to force the tubular valve member 88 rearwardly into engagement with the valve closure member 70. This second stage of valve operating movement closes off communication between lines 36 and 38, and thereafter forces the valve closure member 70 away from the valve port 76 to dump atmosphere pressure into the rear side of the power cylinder 18. The second stage of valve movement, therefore, automatically supplies a full auxiliary vacuum to atmospheric differential pressure across the servo-motor's power piston to provide a full and complete application of the vehicle's brakes. An orifice 98 may be used in the air supply line to the seventh chamber of the control means C to prevent a too rapid second stage brake application, such that atmospheric pressure will be more gradually admitted to the back side of power cylinder 18. It is a further feature of control valve C shown in the drawing that the operator may take over from the automatic application and increase the speed with which the brakes are applied by increasing pressure upon the foot pedal lever P. Input signal from the master cylinder A, if intense enough, will open the control valve 16 wide to dump atmospheric pressure into line 36, the fifth chamber of the control means C, and to the inside of the tubular member through opening 94. Full atmospheric pressure inside of the tubular member 88 will force the valve closure members 70 out of engagement with the end of the tubular valve member 88 to communicate full atmospheric pressure to line 38 and thence to the back side of the power cylinder 18.

It will be apparent that the objects heretofore enumerated as well as others have been achieved. While the preferred embodiment of the invention has been described in considerable detail, I do not wish to be limited to the particular constructions shown which may be varied within the scope of the invention, and it is the intention to cover hereby all adaptations, modifications, and arrangements thereof which come within the practice of those skilled in the art to which the invention relates.

I claim:

1. In an automotive braking system and the like powered by pressure differential: a fluid pressure motor having an internal powered chamber therein; a movable wall in said powered chamber dividing said chamber into opposing chambers into which opposing chambers pressures of different intensity are admitted to actuate the movable wall; a source of pressure whose intensity varies; a substantially constant source of pressure whose intensity differs from said variable source; a control valve normally communicating said variable source of pressure to its outlet, and which when actuated communicates said constant source of pressure to its outlet; an auxiliary supply of pressure corresponding generally in intensity to the normal intensity of said variable source of pressure; valve means which when in one position communicates said outlet of said control valve to said one opposing chamber while at the same time communicating said variable source with the other opposing chamber, and which valve means has a second position in which it communicates said auxiliary source of pressure to said other opposing chamber while communicating said generally constant source of pressure to said one opposing chamber; and means moving said valve means into its second position when the pressure differential between said generally constant source of pressure and said normal but variable source of pressure decreases below a generally predetermined limit.

2. In an automotive braking system and the like powered by pressure differential between the atmosphere and a vacuum source the intensity of which fluctuates; a fluid pressure motor having an internal powered chamber therein; a movable wall in said powered chamber dividing said chamber into opposing chambers; a control valve normally communicating said vacuum source to its outlet and which when actuated communicates atmospheric pressure to its outlet; an auxiliary supply of vacuum; valve means which when in one position communicates the control valve outlet to said one opposing chamber while at the same time communicating said vacuum source with the other opposing chamber, and which valve means has a second position which communicates said auxiliary supply of vacuum to said other opposing chamber while communicating said atmospheric pressure to said one opposing chamber; and means moving said valve means into its second position when the pressure differential between said atmosphere and vacuum sources decreases below a generally predetermined limit.

References Cited in the file of this patent

UNITED STATES PATENTS

| 2,219,689 | Kuiper | Oct. 29, 1940 |
| 2,501,941 | Hollerith | Mar. 28, 1950 |
| 2,645,307 | Stegman | July 14, 1953 |
| 2,703,631 | Hupp | Mar. 8, 1955 |
| 2,719,609 | Price | Oct. 4, 1955 |
| 2,775,980 | Renaudie | Jan. 1, 1957 |